US012203324B2

(12) United States Patent
Lei et al.

(10) Patent No.: US 12,203,324 B2
(45) Date of Patent: Jan. 21, 2025

(54) CURTAIN CORD WINDING DEVICE

(71) Applicant: Leafy Windoware Co., Ltd., Dongguan (CN)

(72) Inventors: Zhenbang Lei, Dongguan (CN); Xingbang Lei, Dongguan (CN)

(73) Assignee: Leafy Windoware Co., Ltd., Dongguan (CN)

( * ) Notice: Subject to any disclaimer, the term of this patent is extended or adjusted under 35 U.S.C. 154(b) by 413 days.

(21) Appl. No.: 17/398,014

(22) Filed: Aug. 10, 2021

(65) Prior Publication Data

US 2022/0408959 A1 Dec. 29, 2022

(30) Foreign Application Priority Data

Jun. 25, 2021 (CN) ........................ 202121435805.0

(51) Int. Cl.
*E06B 9/322* (2006.01)
*E06B 9/30* (2006.01)
*E06B 9/32* (2006.01)
*A47H 5/02* (2006.01)

(52) U.S. Cl.
CPC ................ *E06B 9/322* (2013.01); *A47H 5/02* (2013.01); *E06B 9/30* (2013.01); *E06B 9/32* (2013.01); *E06B 2009/3225* (2013.01); *E06B 2009/3227* (2013.01)

(58) Field of Classification Search
CPC .. A47H 11/06; A47H 3/10; A47H 5/02; E06B 9/322; E06B 2009/3225; E06B 2009/3227; E06B 9/30; E06B 9/32; E06B 2009/3222
USPC ............................................ 16/209; 160/170
See application file for complete search history.

(56) References Cited

U.S. PATENT DOCUMENTS 6,325,131 B1 * 12/2001 Dekker .................. E06B 9/322 160/170
6,973,952 B2 * 12/2005 Nien ...................... E06B 9/322 192/223.4
7,360,574 B2 * 4/2008 Maumi .................. E06B 9/322 160/170

(Continued)

FOREIGN PATENT DOCUMENTS

CN 210783894 U * 6/2020 ......... B65H 75/4492
DE 112007000007 T5 * 6/2010 ............. E06B 9/262

(Continued)

*Primary Examiner* — Eugene G Byrd
*Assistant Examiner* — Jock Wong

(57) ABSTRACT

A curtain cord winding device includes a base, a cord winding mechanism rotatably mounted to the base, and a drive mechanism. The cord winding mechanism includes a main reel fitted about a drive shaft of the drive mechanism, and a secondary reel. The main reel includes a first winding segment for winding a cord, and a screw segment screwed to a screw hole of the base. The main reel and the secondary reel are coaxially arranged and fixed in turn. The secondary reel includes a second winding segment, and a first connecting member. An end of the first winding segment away from the screw segment and an end of the second winding segment away from the first connecting member each is provided with a second connecting member. The first connecting member is fixed to the second connecting member in an axial direction.

12 Claims, 5 Drawing Sheets

(56) References Cited

U.S. PATENT DOCUMENTS

| | | | | |
|---|---|---|---|---|
| 7,464,742 | B2 * | 12/2008 | Oskam | E06B 9/322 160/170 |
| 10,676,989 | B2 * | 6/2020 | Buccola, Jr. | E06B 9/34 |
| 2002/0174961 | A1 * | 11/2002 | Anderson | E06B 9/322 160/178.1 R |
| 2006/0118248 | A1 * | 6/2006 | Anderson | E06B 9/322 160/84.04 |
| 2007/0144686 | A1 * | 6/2007 | Drew | E06B 9/34 160/170 |
| 2009/0020239 | A1 * | 1/2009 | Yu | E06B 9/322 160/331 |
| 2012/0216966 | A1 * | 8/2012 | Krab | E06B 9/322 160/170 |
| 2013/0248125 | A1 * | 9/2013 | Lin | E06B 9/262 160/331 |
| 2014/0360682 | A1 * | 12/2014 | Lee | E06B 9/322 160/174 R |
| 2015/0033910 | A1 * | 2/2015 | Steenbergen | F16H 21/44 74/99 R |
| 2015/0211296 | A1 * | 7/2015 | Zhang | E06B 9/303 160/133 |
| 2015/0300081 | A1 * | 10/2015 | Zhang | E06B 9/38 160/107 |
| 2016/0010390 | A1 * | 1/2016 | Smith | E06B 9/32 160/315 |
| 2017/0211320 | A1 * | 7/2017 | Chen | E06B 9/324 |
| 2017/0298687 | A1 * | 10/2017 | Chen | E06B 9/322 |
| 2018/0347269 | A1 * | 12/2018 | Wang | E06B 9/30 |
| 2019/0128058 | A1 * | 5/2019 | Cheng | F16D 51/04 |

FOREIGN PATENT DOCUMENTS

| | | | | | |
|---|---|---|---|---|---|
| DE | 102009041699 | B3 * | 1/2011 | E06B 9/262 |
| EP | 1431508 | A2 * | 6/2004 | E06B 9/322 |
| EP | 2369120 | A1 * | 9/2011 | E06B 9/308 |
| EP | 3309347 | A1 * | 4/2018 | E06B 9/17046 |
| EP | 3584401 | A1 * | 12/2019 | E06B 9/32 |
| KR | 20170122567 | A * | 11/2017 | |
| TW | 549349 | U * | 8/2003 | |
| WO | WO-2014181706 | A1 * | 11/2014 | E06B 9/303 |
| WO | WO-2020132750 | A1 * | 7/2020 | E06B 9/42 |

* cited by examiner

CURTAIN CORD WINDING DEVICE

FIELD OF THE PRESENT INVENTION

The present invention relates to curtain accessories technical field and, more particularly to a curtain cord winding device.

BACKGROUND OF THE PRESENT INVENTION

In order to keep a curtain body lifting or lowering steadily, a traditional curtain usually has at least two cords symmetrically extending through the curtain body. Correspondingly, a reel is provided for each cord to wind or unwind the cord. However, two or more reels are independently arranged on a beam. On the one hand, it is difficult to ensure the synchronization of the reels, and on the other hand, the length of the reels will occupy a large space in the length direction of the beam. As a result, it is difficult for the curtain body with a narrower width (that is, a shorter beam length) to install multiple reels, and thus the curtain cannot carry out multi-reel winding or unwinding.

SUMMARY OF THE INVENTION

Therefore, the technical problem to be solved by the embodiments of the present invention is to provide a curtain cord winding device, which can steadily retract and unwind curtains in multiple lines, and also adapt to smaller width curtains.

To solve the above-mentioned technical problems, an embodiment of the present invention provides a curtain cord winding device. The curtain cord winding device includes a base, a cord winding mechanism rotatably mounted to the base, and a drive mechanism for driving the cord winding mechanism to rotate. The drive mechanism includes a drive shaft. The cord winding mechanism includes a main reel fitted about the drive shaft and fixed relative to the drive shaft in a circumferential direction, and at least one secondary reel. The main reel includes a first winding segment for winding a cord, and a screw segment connected to an end of the first winding segment and screwed to a screw hole of the base. The main reel and the at least one secondary reel are coaxially arranged and are fixed in turn. Each of the at least one secondary reel includes a second winding segment with the same structure as the first winding segment, and a first connecting member arranged at an end of the second winding segment. An end of the first winding segment away from the screw segment and an end of the second winding segment away from the first connecting member each is provided with a second connecting member. The first connecting member on each of the at least one secondary reel is fixed to the second connecting member on an adjacent one of the main reel and the at least one secondary reel in an axial direction.

Furthermore, the first connecting member includes two elastic arms each forming a hook at a distal end, and the second connecting member includes a cylinder for being fixed to the first winding segment or the second winding segment, and an end plate connected to the cylinder. A middle of the end plate defines a through hole for the drive shaft extending through. Two fixing grooves are defined in a periphery of the through hole. The elastic arms extend through the fixing grooves from an outer side of the end plate, and an end surface of the corresponding second winding segment and the corresponding hooks are abutted against the outer side and an inner side of the end plate, respectively.

Furthermore, two positioning slots are defined in the periphery of the through hole. The first connecting member further includes two positioning pins. When the first connecting member is connected to the corresponding second connecting member, the positioning pins are engaged in the corresponding positioning slots.

Furthermore, a middle of each of the main reel and the at least one secondary reel defines an insertion hole whose cross section is non-circular and is adapted to a cross section of the drive shaft, and the drive shaft is inserted into the insertion hole.

Furthermore, each of the first winding segment and the second winding segment includes a small-diameter section, a cone section, and a large-diameter section connected in order along the axial direction. An outer diameter of the cone section gradually increases from the small-diameter section to the large-diameter section. An end of the large-diameter section away from the small-diameter section forms a fixing portion for fixing a tail end of the cord. An end of the small-diameter section of the first winding segment away from the corresponding large-diameter section is connected to the screw segment. The second connecting member is arranged inside the end of the corresponding large-diameter section away from the cone section.

Furthermore, the cylinder is provided with two positioning grooves, and a plurality of elastic tabs each forming a positioning protrusion protruding out from a distal end. An inner wall of the corresponding large-diameter section forms two positioning ribs and a plurality of positioning holes. When the second connecting member is engaged in the large-diameter section, the positioning ribs are engaged in the corresponding positioning grooves, and the positioning protrusion of each of the plurality of elastic tabs is engaged in a corresponding one of the plurality of positioning holes.

Furthermore, outer sides of the small-diameter section, the cone section, and the large-diameter section are all provided with first external threads that are connected in order. The base defines a cord outlet. An opposite end of the cord extends outside the base through the cord outlet. A part of the cord located between the fixing portion and the cord outlet is wound and extended along thread grooves of the first external threads.

Furthermore, the first threads on the small-diameter section are connected with second external threads that are formed on the outer side of the screw segment for screwing with the screw hole.

Furthermore, the base forms cord guiding holders, respectively corresponding to the main reel and the at least one secondary reel, to respectively guide cords to be wound onto the main reel or the at least one secondary reel. The end of the large-diameter section away from the small-diameter section is further provided with a positioning portion protruding from an outer surface of the large-diameter section, to abut against a corresponding cord guiding holder so as to position an initial position of the main reel or the at least one secondary reel.

Furthermore, a nut is embedded in one end of the base, and a threaded hole of the nut functions as the screw hole.

By adopting the above technical solution, embodiments of the present application have at least the following beneficial effects. In the embodiments of the present application, the winding mechanism is provided with one main reel and at least one secondary reel. The main reel is fitted about the drive shaft and is circumferentially fixed relative to the drive shaft, and the main reel further includes a screw segment screwed to the base. One first connecting member and one second connecting member are respectively arranged at both ends of each secondary reel, and one second connecting member is also arranged at the end of the main reel away from the screw segment. The main reel and the at least one secondary reel are coaxially arranged and fixedly connected in sequence. The first connecting member on each secondary reel is fixedly connected to the second connecting member on the adjacent one of the main reel and the secondary reel, thereby realizing the series connection of the multiple reels and the relative fixation in the circumferential direction, which ensures the synchronization of multiple reels for retracting or releasing the curtain. At the same time, only need to set the screw segment on the main reel to fix the entire cord winding mechanism to the base, thereby minimizing the size of the position occupied by the multiple reels in the width direction of the curtain, and making the device suitable for more small width curtains.

DETAILED DESCRIPTION OF THE PRESENT INVENTION

Figure 1:
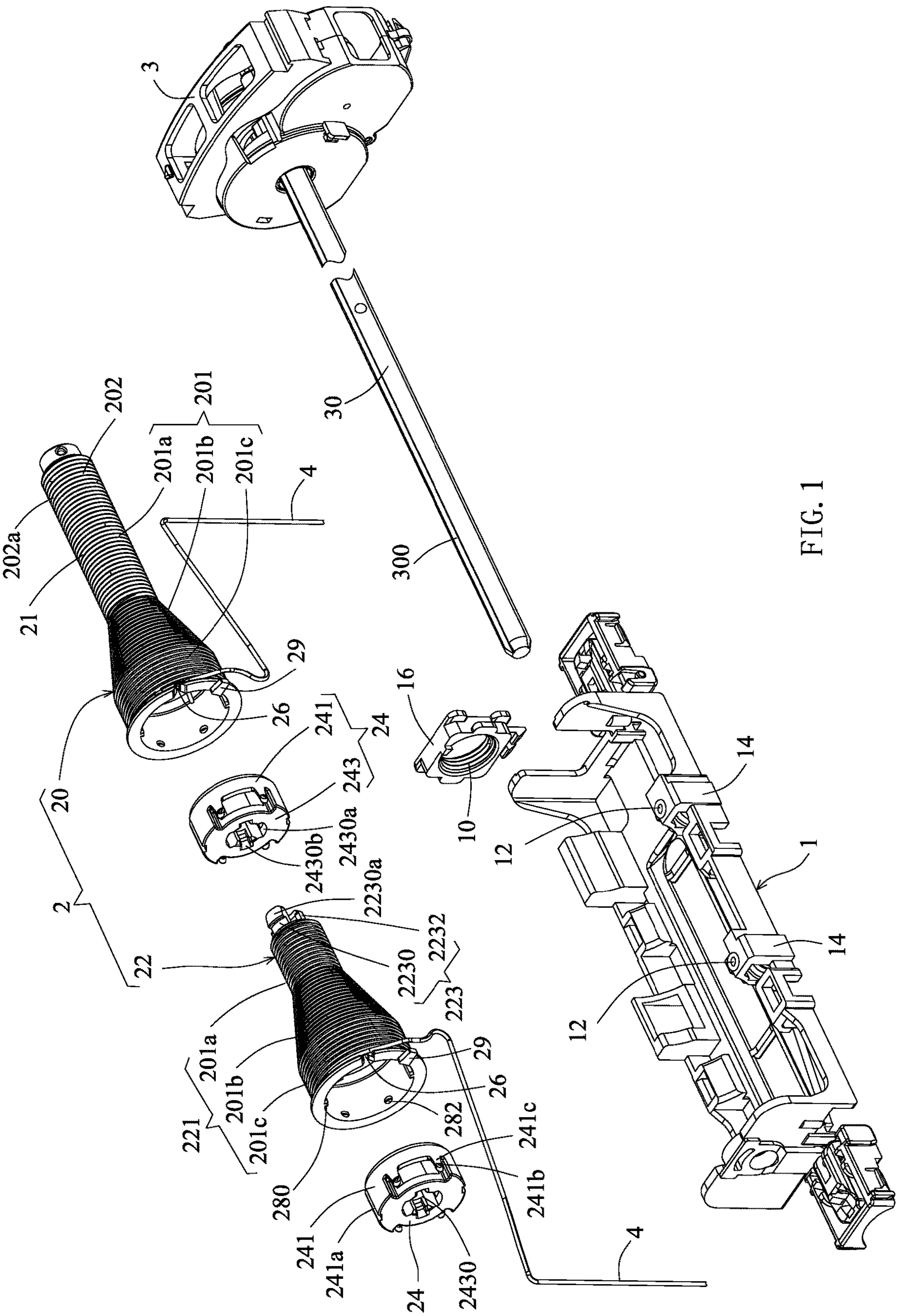
FIG. 1 is an exploded, isometric view of an embodiment of a curtain cord winding device.

The present application will be further described in detail below with reference to the accompanying drawings and specific embodiments. It should be understood that the following illustrative embodiments and illustrations are only used to explain the present invention and are not intended to limit the present invention, and that the embodiments of the present invention and the features of the embodiments can be combined with each other without conflict.

Referring to FIGS. 1-5, an embodiment of the present disclosure provides a curtain cord winding device including a base 1, a cord winding mechanism 2 rotatably mounted to the base 1, and a drive mechanism 3 for driving the cord winding mechanism 2 to rotate. The cord winding mechanism 2 includes a main reel 20 fitted about a drive shaft 30 of the drive mechanism 3 and fixed relative to the drive shaft 30 in the circumferential direction. The main reel 20 includes a first winding segment 201 for winding a cord 4, and a screw segment 202 connected to an end of the first winding segment 201 and screwed with a screw hole 10 on the base 1. The cord winding mechanism 2 further includes at least one secondary reel 22. The main reel 20 and the at least one secondary reel 22 are coaxially arranged and are fixed in turn. Each secondary reel 22 includes a second winding segment 221 with the same structure as the first winding segment 201, and a first connecting member 223 arranged at an end of the second winding segment 221. An end of the first winding segment 201 away from the screw segment 202 and an end of the second winding segment 221 away from the first connecting member 223 each is provided with a second connecting member 24. The first connecting member 223 on each secondary reel 22 is fixed to the second connecting member 24 on the main reel 20 or the secondary reel 22 in the axial direction.

In the embodiment of the present application, the cord winding mechanism 2 including the main reel 20 and the at least one secondary reel 22 is provided. The main reel 20 is fitted about the drive shaft 30 and is fixed relative to the drive shaft 30 in the circumferential direction. One end of the main reel 20 is also provided with a screw segment 202 screwed to the base 1, and two ends of each secondary reel 22 are provided with one first connecting member 223 and one second connecting member 24, respectively. The end of the main reel 20 away from the screw segment 202 is provided with one second connecting member 24. The main reel 20 and the at least one secondary reel 22 are arranged coaxially and fixedly connected in sequence. The first connecting member 223 on each secondary reel 22 is connected to the second connecting member 24 on the adjacent one of the main reel 20 and the at least one secondary reel 22 on the axial direction, thereby realizing the serial connection of the multiple reels and the fixation in the circumferential direction, which ensures the synchronization of the retracting or releasing curtains of the multiple reels. The screw segment 202 only needs to be provided on the main reel 20 to fix the entire cord winding mechanism 2 to the base 1, thereby minimizing the size of the position occupied by the multiple reels in the width direction of the curtain, making the device suitable for curtains with smaller widths.

In an embodiment of the present application, the first connecting member 223 includes two elastic arms 2230 each with a hook **2230*a* at a distal end. The second connecting member 24 includes a cylinder 241 for being fixed to the first winding segment 201 or the second winding segment 221, and an end plate 243 connected to the cylinder 241 as a whole. A through hole 2430 for the drive shaft 30 extending through is defined in a middle of the end plate 243. Two fixing grooves 2430*a* are formed in the periphery of the through hole 2430. The elastic arms 2230 are extended through the fixing grooves 2430*a* of the through hole 2430 from an outer side of the end plate 243, and an end surface of the second winding segment 221 and the hooks 2230*a* are respectively abutted against the outer side and an inner side of the end plate 243**.

In the embodiment, the elastic arms 2230 with the hooks **2230*a* at the distal ends are provided on the first connecting member 223, and the fixing grooves 2430*a* are defined in the periphery of the through hole 2430 in the middle of the end plate 243 of the second connecting member 24. In assembly, the elastic arms 2230 are extended through the fixing grooves 2430*a* of the through hole 2430 from the outer side of the end plate 243, and after being in place, the end surface of the second winding segment 221 and the hooks 2230*a* are respectively abutted against the outer side and the inner side of the end plate 243 of the second connecting member 24 on the adjacent main reel 20 or secondary reel 22**. Therefore, a stable connection is achieved without falling off.

In an embodiment of the present application, the periphery of the through hole 2430 is further formed with two positioning slots **2430*b*, and the first connecting member 223 further includes two positioning pins 2232. When the first connecting member 223 is connected to the second connecting member 24, the positioning pins 2232 are engaged in the positioning slots 2430*b* to be positioned. In the embodiment, the positioning slots 2430*b* are formed on the periphery of the through hole 2430, and correspondingly, the first connecting member 223 further includes the positioning pins 2232. Therefore, when the first connecting member 223 is connected to the second connecting member 24, the positioning pins 2232 are engaged in the positioning slots 2430***b* for positioning, which can make the connection operation of the first connecting member 223 and the second connecting member 24 faster, so as that the positioning effect is better, and the connection is more stable.

Figure 4:
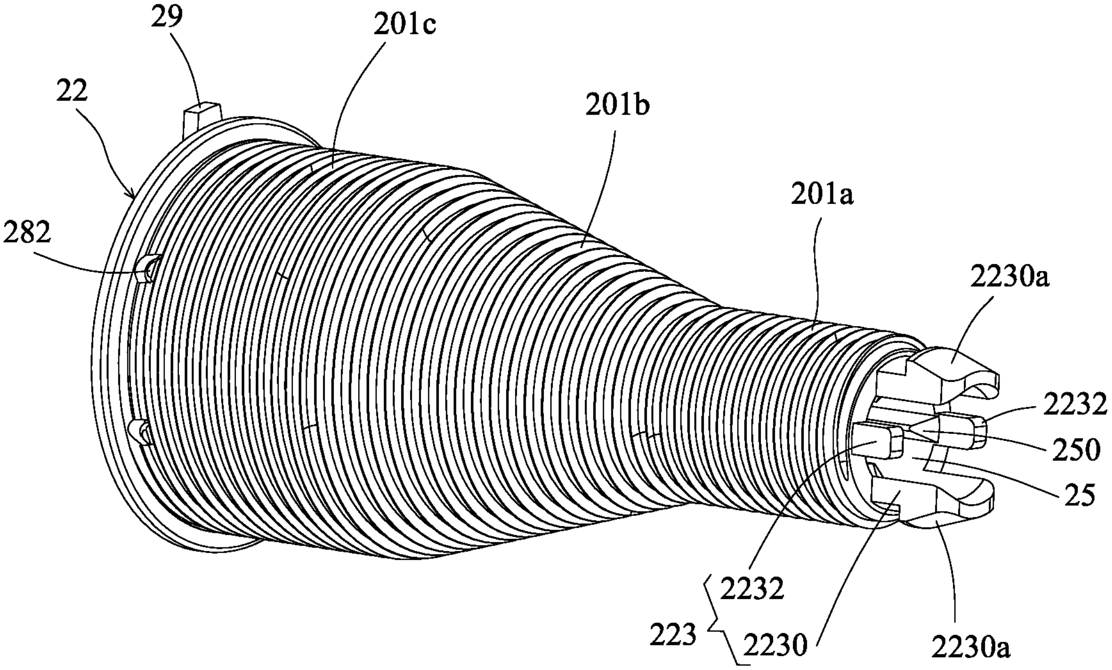
FIG. 4 is an enlarged view of a secondary reel of FIG. 1, but viewed from another perspective.
Figure 5:
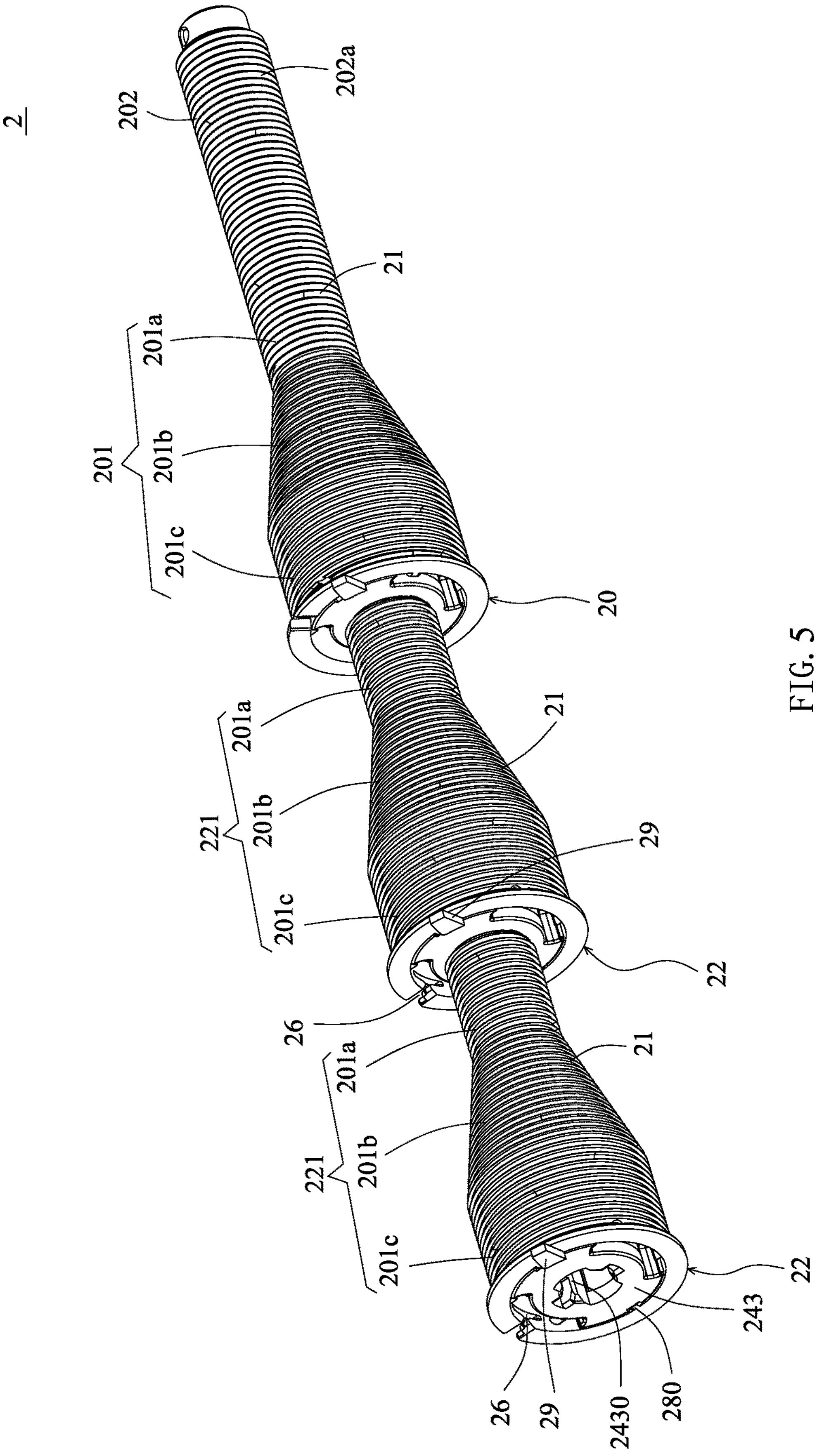
FIG. 5 is an assembled, isometric view of a cord winding mechanism of another embodiment of a curtain cord winding device.

In an embodiment of the present application, referring to FIG. 4, a middle of the main reel 20 and/or each secondary reel 22 defines an insertion hole 25 whose cross section is non-circular and is adapted to a cross section of the drive shaft 30, and the drive shaft 30 corresponds to be inserted into the insertion hole 25. In the embodiment, the non-circular insertion hole 25 is defined in the middle of the main reel 20 and/or the secondary reel 22, so that the main reel 20 and/or the secondary reel 22 and the drive shaft 30 inserted therein will not slide relative to each other in the circumferential direction, which ensures the effective transmission of the drive shaft 30. In the embodiment shown in FIG. 4, an inner wall of the insertion hole 25 is formed with a rib 250, so that the cross section of the insertion hole 25 is non-circular, which matches a corresponding groove 300 defined in the drive shaft 30 to realize positioning and transmission cooperation.

In an embodiment of the present disclosure, the first winding segment 201 and the second winding segment 221 each includes a small-diameter section 201*a*, a cone section 201*b*, and a large-diameter section 201*c* connected in order along the axial direction. An outer diameter of the cone section 201*b* gradually increases from the small-diameter section 201*a* to the large-diameter section 201*c*. An end of the large-diameter section 201*c* away from the small-diameter section 201*a* is provided with a fixing portion 26 for fixing a tail end of the cord 4. An end of the small-diameter section 201*a* of the first winding segment 201 away from the large-diameter section 201*c* is connected to the screw segment 202. The second connecting member 24 is arranged inside the end of the large-diameter section 201*c* away from the cone section 201*b*. In the embodiment, the first winding segment 201 and the second winding segment 221 each is provided with the small-diameter section 201*a*, the cone section 201*b*, and the large-diameter section 201*c* connected in order along the axial direction, and the fixing portion 26 is formed on the end of the large-diameter section 201*c* away from the small-diameter section 201*a*. When the curtain is released or retracted, the curtain body is at different heights, and the cords 4 with stress points at different positions on the first winding segment 201 or the second winding segment 221 can be matched with different tube outer diameters. Therefore, it is ensured that the moment of the cord 4 functioning on the first winding segment 201 or the second winding segment 221 during the entire retracting or releasing process is relatively stable, and the drive mechanism 3 with a constant torque output can be used to reduce costs. At the same time, the second connecting member 24 is arranged inside the large-diameter segment 201*c*, to facilitate the insertion and connection of the first connecting member 223 at the end of the small-diameter section 201*a*, and to further shorten the axial length of the cord winding mechanism 2.

Figure 3:
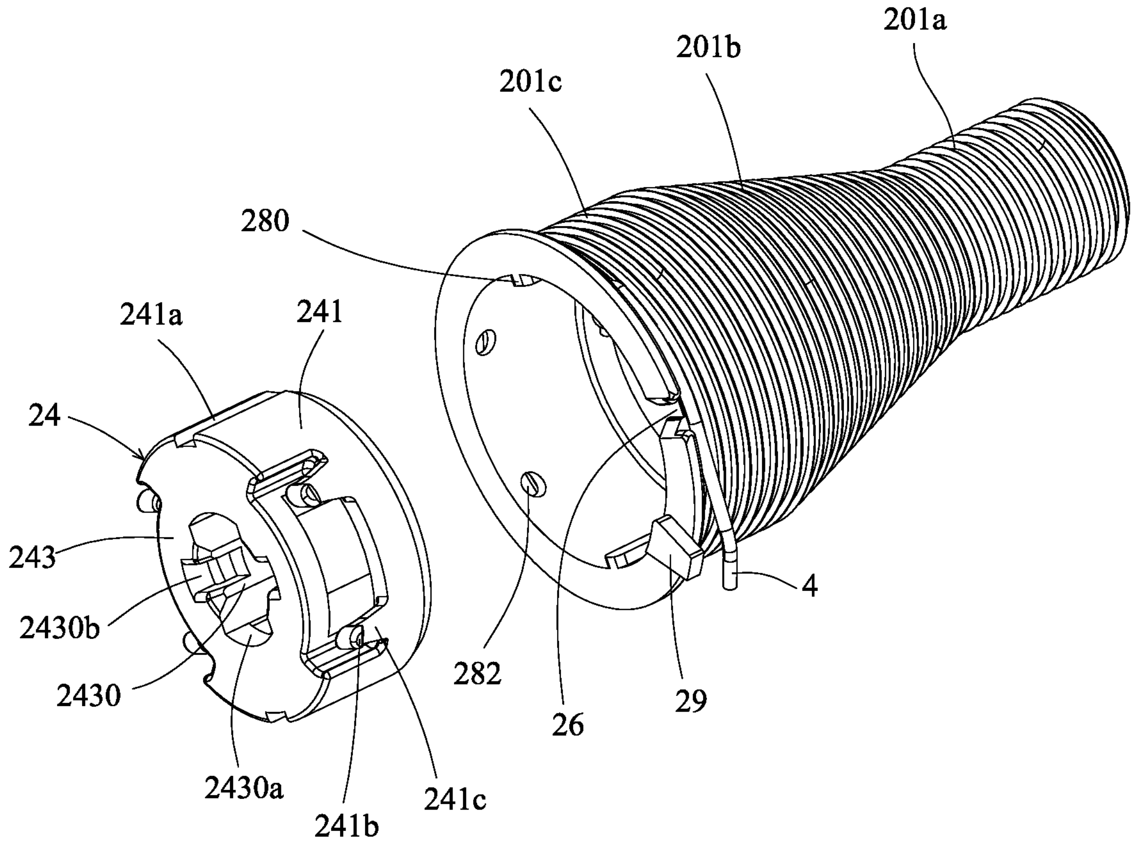
FIG. 3 is an enlarged view of a main reel and a second connector of FIG. 1.

In an embodiment of the present disclosure, referring to FIG. 3, the cylinder 241 is also provided with two positioning grooves 241*a*, and a plurality of elastic tabs 241*c* each with a positioning protrusion 241*b* protruding out from a distal end. An inner wall of the large-diameter section 201*c* forms two positioning ribs 280 and a plurality of positioning holes 282. When the second connecting member 24 is engaged in the large-diameter section 201*c*, the positioning ribs 280 are engaged in the corresponding positioning grooves 241*a*, and the positioning protrusions 241*b* of the elastic tabs 241*c* are engaged in the corresponding positioning holes 282. In the embodiment, the positioning grooves 241*a* and the elastic tabs 241*c* with the positioning protrusions 241*b* are provided on the cylinder 241, and the positioning ribs 280 and the positioning holes 282 are correspondingly provided on the inner wall of the large-diameter section 201*c*. Therefore, when the second connecting member 24 is assembled inside the large-diameter section 201*c*, the positioning grooves 241*a* and the positioning ribs 280 are engaged to achieve axial guidance and circumferential positioning. When the second connecting member 24 is plugged into place, the positioning protrusions 241*b* and the positioning holes 282 are snap-fitted to achieve circumferential and axial positioning, to prevent the second connecting member 24 from disengaging from the large-diameter section 201*c*, thereby realizing an effective fixed connection between the second connecting member 24 and the main reel 20 or the secondary reel 22, and the structure is simple and it is convenient to assemble. In disassembly, the positioning protrusions 241*b* only need to be pushed from the outside to make the positioning protrusions 241*b* disengage from the positioning holes 282, and then the second connecting member 24 can be pulled out from the inside of the large diameter section 201*c*.

In an embodiment of the present disclosure, referring to FIGS. 1-5, outer sides of the small-diameter section 201*a*, the cone section 201*b*, and the large-diameter section 201*c* are all provided with first external threads 21 that are connected in order. The base 1 defines a cord outlet 12. The tail end of the cord 4 is fixed to the fixing portion 26, and an opposite end of the cord 4 extends outside the base 1 through the cord outlet 12. A part of the cord 4 located between the fixing portion 26 and the cord outlet 12 is wound and extended along thread grooves of the first external threads 21. In the embodiment, the fixing portion 26 and the first external threads 21 are arranged on the cord winding mechanism 2, and the cord outlet 12 is defined in the base 1 to guide and wind the cord 4 in an orderly manner, avoiding the cord 4 to slip off from the cord winding mechanism 2 or to be tangled in disorder, so that the retracting or unwinding of the cord 4 is more smooth, and the phenomenon of asynchronous retracting or unwinding of different cords is avoided.

Figure 2:
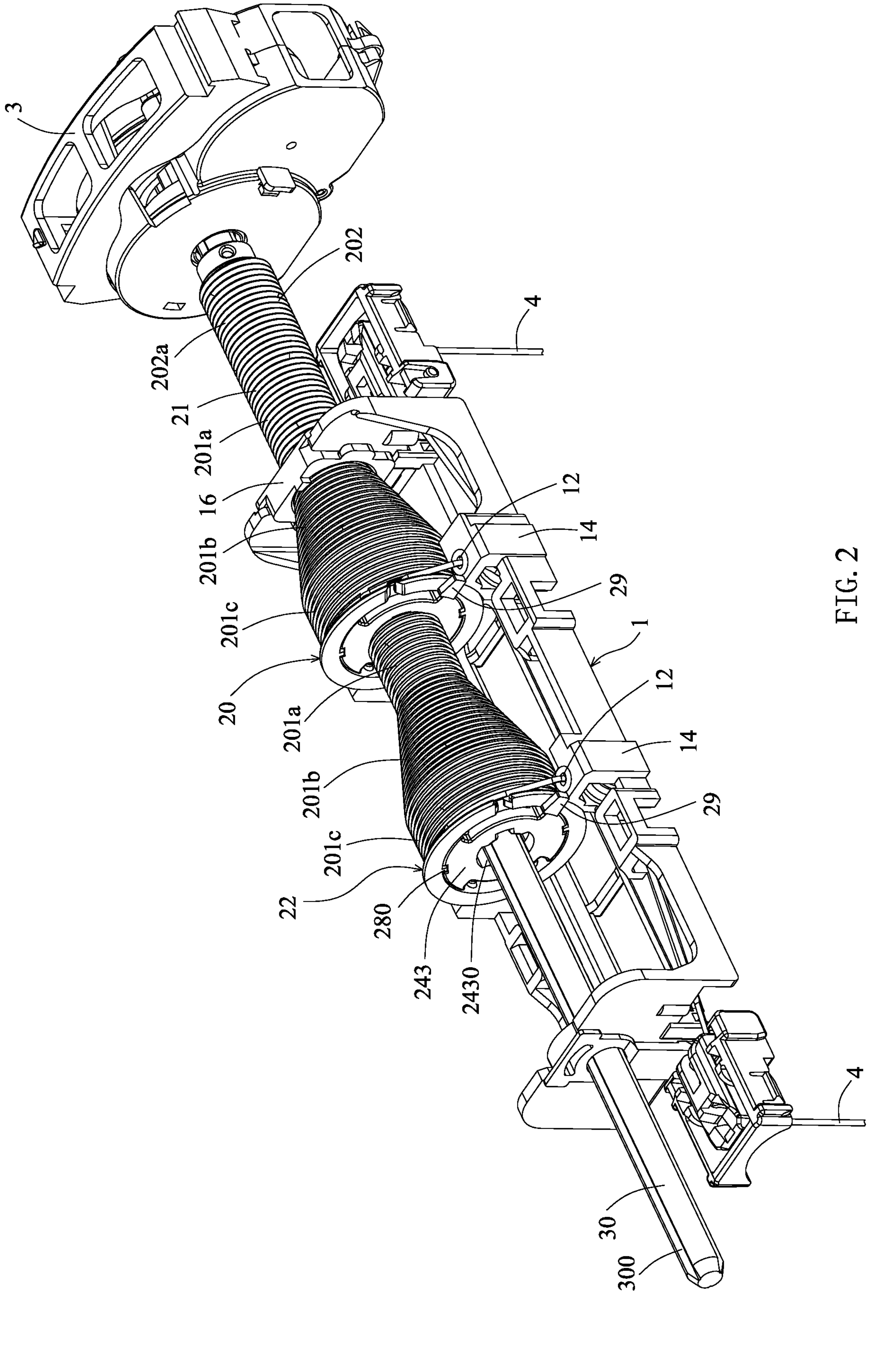
FIG. 2 is an assembled, isometric view of FIG. 1.

In an embodiment of the present disclosure, referring to FIG. 1 and FIG. 2, the first external threads 21 on the small-diameter section 201*a* are also connected with second external threads 202*a* formed on the outer side of the screw section 202 and screwing with the screw hole 10. In the embodiment, the first external threads 21 and the second external threads 202*a* are set as an integral connection, which can effectively utilize the small diameter section 201*a* to be screwed to the screw hole 10, thereby further shortening the length of the main reel 20.

In an embodiment of the present disclosure, referring to FIGS. 1-3, the base 1 forms cord guiding holders 14, corresponding to the main reel 20 and the secondary reel 22, to respectively guide the cords 4 to be wound onto the main reel 20 or the secondary reel 22. The end of the large-diameter section 201*c* away from the small-diameter section 201*a* is further provided with a positioning portion 29 protruding from an outer surface of the large-diameter section 201*c*, to abut against the cord guiding holder 14 so as to position an initial position of the main reel 20 or the secondary reel 22. In the embodiment, the cord guiding holder 14 is provided on the base 1, to facilitate assembly. At the same time, the positioning portions 29 protrude from the outer surfaces of the large-diameter sections 201*c*, and the positioning portions 29 abut against the cord guiding holders 14 to position the initial positions of the main reel 20 and the secondary reel 22, which can ensure that the cords 4 respectively wound on the main reel 20 and the secondary reel 22 can be retracted or unwound synchronously, so as to avoid the deflection of the curtain body during retracting or releasing of the curtain.

In an embodiment of the present disclosure, referring to FIG. 1, a nut 16 is embedded at one end of the base 1, and the threaded hole of the nut 16 functions as the screw hole 10. In the embodiment, the nut 16 is embedded at the end of the base 1, and the threaded hole on it is the screw hole 10 to which the screw section 202 is screwed. The nut 16 as a common mechanical part is economical and easy to obtain, and is easy to maintain and replace.

The embodiments of the present application have been described above with reference to the accompanying drawings, but the present application is not limited to the specific implementations described above, and the specific implementations described above are only schematic and not limiting. Under the enlightenment of this application, many forms can be made without departing from the scope of this application and the scope of protection of the claims, and these are all included in the scope of protection of this application.

What is claimed is:

1. A curtain cord winding device, comprising:

a base forming a screw hole;

a cord winding mechanism rotatably mounted to the base; and a drive mechanism for driving the cord winding mechanism to rotate, wherein the drive mechanism comprises a drive shaft;

wherein the cord winding mechanism comprises a main reel fitted about the drive shaft and fixed relative to the drive shaft in a circumferential direction, and at least one secondary reel, the main reel comprises a first winding segment for winding a cord, and a screw segment connected to an end of the first winding segment and screwed to the screw hole of the base;

wherein the main reel and the at least one secondary reel are coaxially arranged and are fixed in turn, each of the at least one secondary reel comprises a second winding segment with a same structure as the first winding segment, and a first connecting member arranged at an end of the second winding segment; wherein the main reel and the at least one secondary reel are screwed to the base only through the screw segment of the main reel being screwed to the screw hole; and wherein an end of the first winding segment away from the screw segment and an end of the second winding segment away from the first connecting member each is provided with a second connecting member, the first connecting member on each of the at least one secondary reel is fixed to the second connecting member on an adjacent one of the main reel and the at least one secondary reel in an axial direction.

2. The curtain cord winding device of claim 1, wherein the first connecting member comprises two elastic arms each forming a hook at a distal end, the second connecting member comprises a cylinder for being fixed to the first winding segment or the second winding segment, and an end plate connected to the cylinder, a middle of the end plate defines a through hole for the drive shaft extending through; wherein two fixing grooves are defined in a periphery of the through hole, the elastic arms extend through the fixing grooves from an outer side of the end plate, and an end surface of the second winding segment and the hooks are abutted against the outer side and an inner side of the end plate, respectively.

3. The curtain cord winding device of claim 2, wherein two positioning slots are defined in the periphery of the through hole interlaced with the fixing grooves, the first connecting member further comprises two positioning pins interlaced with the elastic arms, wherein when the first connecting member is connected to the corresponding second connecting member, the positioning pins are engaged in the corresponding positioning slots.

4. The curtain cord winding device of claim 2, wherein a middle of each of the main reel and the at least one secondary reel defines an insertion hole whose cross section is non-circular and is adapted to a cross section of the drive shaft, the drive shaft is inserted into the insertion hole.

5. The curtain cord winding device of claim 2, wherein each of the first winding segment and the second winding segment comprises a small-diameter section, a cone section, and a large-diameter section connected in order along the axial direction, an outer diameter of the cone section increases from the small-diameter section to the large-diameter section; wherein an end of the large-diameter section away from the small-diameter section forms a fixing portion for fixing a tail end of the cord, an end of the small-diameter section of the first winding segment away from the large-diameter section is connected to the screw segment, the second connecting member is arranged inside the end of the large-diameter section away from the cone section.

6. The curtain cord winding device of claim 5, wherein the cylinder is provided with two positioning grooves, and a plurality of elastic tabs each forming a positioning protrusion protruding out from a distal end, an inner wall of the large-diameter section forms two positioning ribs and a plurality of positioning holes; wherein when the second connecting member is engaged in the large-diameter section, the positioning ribs are engaged in the corresponding positioning grooves, and the positioning protrusion of each of the plurality of elastic tabs is engaged in a corresponding one of the plurality of positioning holes.

7. The curtain cord winding device of claim 5, wherein outer sides of the small-diameter section, the cone section, and the large-diameter section are all provided with first external threads that are connected in order, the base defines a cord outlet, the end of the large-diameter section away from the small-diameter section is provided with the fixing portion for fixing the tail end of the cord; wherein an opposite end of the cord extends outside the base through the cord outlet, a part of the cord located between the fixing portion and the cord outlet is wound and extended along thread grooves of the first external threads.

8. The curtain cord winding device of claim 7, wherein the first external threads on the small-diameter section are connected with second external threads that are formed on an outer side of the screw segment for screwing with the screw hole.

9. The curtain cord winding device of claim 5, wherein the base forms cord guiding holders, respectively corresponding to the main reel and the at least one secondary reel, to respectively guide cords to be wound onto the main reel or the at least one secondary reel; the end of the large-diameter section away from the small-diameter section is further provided with a positioning portion protruding from an outer surface of the large-diameter section, to abut against a corresponding cord guiding holder so as to position an initial position of the main reel or the at least one secondary reel.

10. The curtain cord winding device of claim 1, wherein a nut is embedded in one end of the base, and a threaded hole of the nut functions as the screw hole.

11. The curtain cord winding device of claim 1, wherein a middle of each of the main reel and the at least one secondary reel defines an insertion hole whose cross section is non-circular and is adapted to a cross section of the drive shaft, the drive shaft is inserted into the insertion hole.

12. The curtain cord winding device of claim 3, wherein a middle of each of the main reel and the at least one secondary reel defines an insertion hole whose cross section is non-circular and is adapted to a cross section of the drive shaft, the drive shaft is inserted into the insertion hole.

* * * * *